Dec. 11, 1956  J. KARMAZIN  2,773,301
METHOD OF MAKING HEAT EXCHANGE UNIT
Filed Nov. 21, 1950  2 Sheets-Sheet 1

HIGHLY COMPRESSED
BONDING MATERIAL

INVENTOR.
JOHN KARMAZIN.
BY
HIS ATTORNEYS

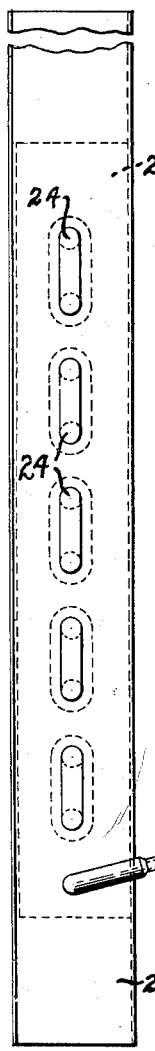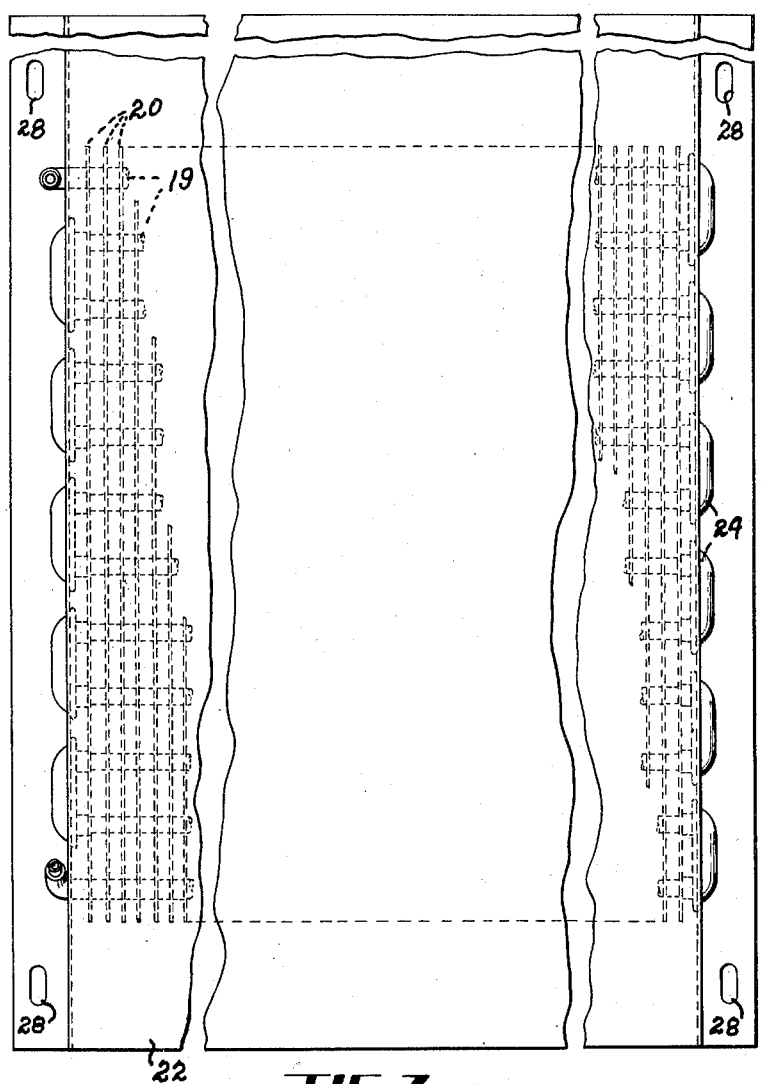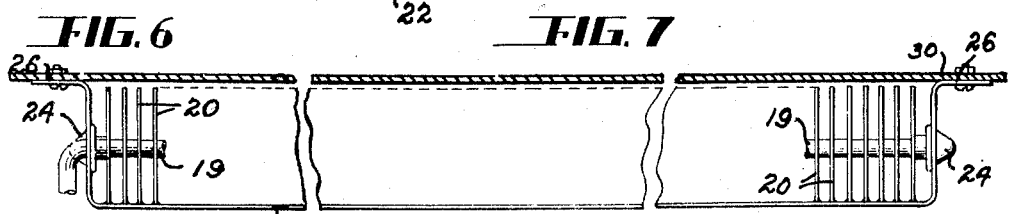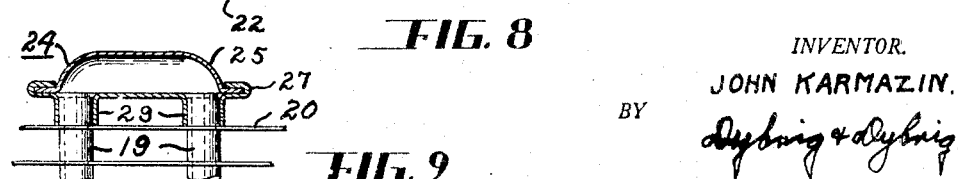

ing the construction and arrangement of the return bends.

Referring now to the drawings wherein I have shown a preferred embodiment of my invention, reference numeral 10 designates a strip of sheet metal used in the manufacture of the tubing used in the heat exchange units. Figure 1 shows the strip 10 passing between a series of pairs of rollers or forming dies carried by the framework 11 and used in forming the strip of metal into tube formation. A first pair of rollers 12 serves to form a channel 16 adjacent the one edge of the strip before that edge of the strip is flattened.

United States Patent Office 2,773,301
Patented Dec. 11, 1956

2,773,301
METHOD OF MAKING HEAT EXCHANGE UNIT

John Karmazin, Grosse Ile, Mich.

Application November 21, 1950, Serial No. 196,889

1 Claim. (Cl. 29—157.3)

This invention relates to a heat exchange unit and the method of manufacturing such a unit.

One of the big problems in the manufacture of heat exchange units is that of efficiently supplying an adequate amount of bonding material to all of the seams of the heat exchange unit without wasting any bonding material. Another problem is that of assembling the parts to be bonded or brazed with a minimum amount of time and effort.

It is an object of this invention to provide an improved method of manufacturing heat exchange units which not only conserves on the amount of bonding material used, but also makes it possible to assemble and braze the parts of the heat exchange units with a minimum amount of time and expense. This is accomplished in part by brazing the fins to the tubes at the same time that the seams of the tubes are brazed.

It has been found that the most efficient utilization of the brazing material takes place when the brazing material is applied directly to the seams in the tubing. It is an object of this invention to apply the brazing material to the seams in such a manner and in such a quantity that upon assembling the fins to the tubes and heating the assembly to the brazing temperature, the individual tubes will all be brazed and a sufficient quantity of brazing material will escape from the seams so as to braze the fins to the tubing.

Other objects and advantages reside in the construction of parts, the combination thereof and the mode of operation, as will become more apparent from the following description.

In the drawings:

Figure 6 is an end elevational view showing a heat exchange unit using tubes of the type shown in Figure 5;

Figure 7 is a side elevational view showing the construction and arrangement of the heat exchange unit shown in Figure 6;

Figure 1:
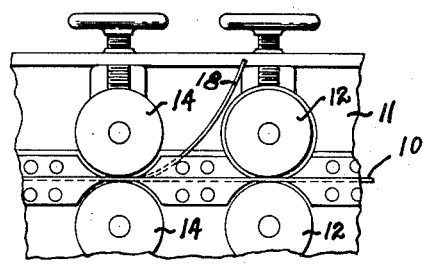
Figure 1 is a fragmentary sectional view showing somewhat diagrammatically a portion of the tube forming apparatus used in one stage of the manufacture of the heat exchange unit.
Figure 2:
Figure 2 is a sectional view on an enlarged scale showing the cross sectional shape of a metal strip used in forming the tube portion of the heat exchanger after the strip has passed through the first pair of forming rollers.
Figure 3:
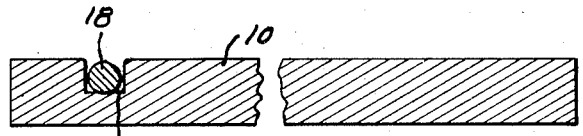
Figure 3 is a similar sectional view showing bonding material inserted into the longitudinally extending pocket or recess formed by the first pair of rollers.
Figure 4:
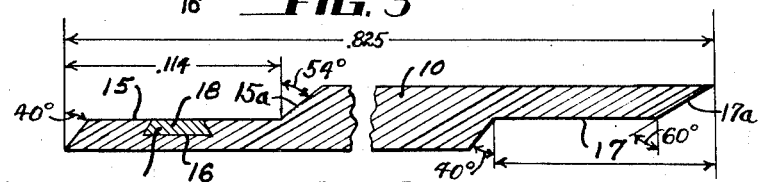
Figure 4 is a similar sectional view showing the shape of the strip and the bonding material after passing between the second pair of forming rollers.

Figure 8 is a plan view of the heat exchange unit showing the arrangement of the tubing and the fins relative to the supporting shell; and Figure 9 is a fragmentary view, partly in section, show- A second pair of rollers 14 serves to flatten out the edges of the strip, as indicated at 15 and 17, with the result that the strip 10 takes the shape shown in Figure 4. The values given in Figure 4 have been given for purposes of illustrating preferred dimensions when manufacturing heat exchangers using one-quarter inch tubing. Other values could be used without departing from the spirit of my invention. A bonding wire 18 is placed over the groove or channel 16, as indicated in Figures 1 and 3, before the strip 10 and the bonding material are passed between the rollers 14, so that as the strip and the bonding material 18 pass between the rollers 14, the bonding material is flattened out and highly compressed into the shape shown in Figure 4. The amount of bonding material placed within the channel or pocket 16 is such that none of the bonding material overflows onto the surfaces adjacent the channel 16, but enough bonding material is present to cause all of the bonding material in the groove 16 to be highly compressed by the rollers 14.

The material in the metal strip adjacent the bonding material 18 will also be highly compressed, with the result that when heat is subsequently applied to the assembly, the natural expansion of the compressed metallic materials, especially the bonding material, will serve to force the necessary amount of bonding material out of the channel 16 onto the surfaces to be bonded without leaving any appreciable voids in the channel 16.

Figure 5:
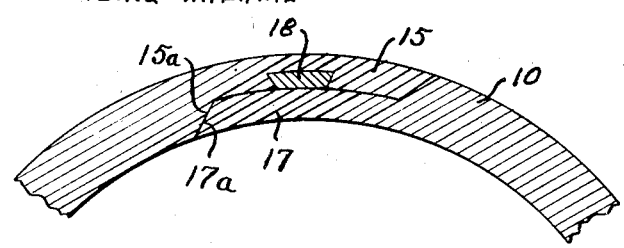
Figure 5 is a fragmentary sectional view showing the strip after it is bent into tube formation.

Prior to the application of heat to the tubing shown in Figure 5, the tubing is cut into sections 19 which are used to form the liquid passages of a heat exchange unit of the type shown in Figures 6 through 9. As shown in these latter figures, the tube sections 19 are passed through aligned holes in a plurality of flat fins 20 which are arranged side by side. No special orientation of the tube sections with respect to the fins is necessary. Return bends 24 are provided for connecting the respective ends of the tubes 19. Each return bend is made from a pair of stampings, as best shown in Figure 9. The one stamping is provided with tubular projections 29 and the other stamping is provided with a raised portion 25. The edges of the stampings are interlocked as shown at 27.

In order to reduce the amount of time and expense which is usually present in the manufacture of heat exchange units and in order to simplify the brazing operation, I assemble the tubes 10, the fins 20, return bend elements 24, and the specially constructed supporting frame 22 into a unitary device which may be handled as a unit and brazed in a single operation. As best shown in Figure 8, the supporting frame 22 is substantially U-shaped in cross section with the bottom of the U being arranged directly in contact with the edges of the fins 20 and with the arms of the U serving to position the return bends 24, which in turn cooperate with the tubes 19 and the associated fins 20 to hold everything in assembled relationship prior to and during the brazing operation.

The assembly as shown in Figures 6 through 9 is inserted into the brazing furnace (not shown) as a unit and all of the seams and joints are then brazed simultaneously. The brazing material 18 serves to supply the necessary material for bonding the seams of the tubes, as well as for bonding the fins to the tubes. Additional bonding material may be added at the return bends, if necessary. This added material may be in any convenient form, such as in the form of a strip of brazing material laid across the return bends or in the form of brazing powder placed directly within the return bends. All excess bonding material collects in the bottom of the U-shaped frame 22 and serves to bond the fins to the frame.

By controlling the length of time the heat exchange units are subjected to the high temperatures necessary for fusing the brazing material, it is possible to control the amount of brazing material escaping from the groove 16 into the seams of the tube and out to the point of contact between the fins and the tubes. The length of time that the assembly is subjected to heat will, of course, depend upon the size and thickness of the tubing, as well as other factors, but the important point is that the heat exchanger be not subjected to heat any longer than just necessary to fuse the bonding material and cause enough flow to properly bond the desired surfaces. The length of time required will be the same for all heat exchange units of a given size and design and can be readily determined by an inspection of the heat exchangers coming out of the brazing furnace. It has been found that by thus controlling the length of time that the assembly is heated and then promptly cooling the assembly, it is possible to very greatly reduce the amount of scrap which normally results from excessive heating or improper distribution of brazing material within the seams of the tubing. Controlling the time also conserves on the amount of bonding material required, since less of the bonding material runs out of the seams to be bonded.

My invention is particularly suitable for manufacturing heat exchange units of the type commonly used as condensers for household refrigerators. As best illustrated in Figures 6 through 9, the specially constructed supporting frame 22 not only serves to properly support the various parts making up the heat exchanger prior to and during the brazing operation, but also serves as a combination frame and baffle for use in attaching the heat exchange units to a supporting surface, such as the back wall of a refrigerator. The arms of the U are provided with outwardly extending flanges 26 which are used in mounting the heat exchange unit. The flanges are provided with elongated slots 28, as best shown in Figure 7, for use in bolting the heat exchanger in place.

By virtue of the arrangement shown, it is obvious that the supporting frame 22 cooperates with the surface on which the heat exchanger is supported to form a flue or chimney. The frame 22, being in direct contact with the fins, serves to dissipate heat also. Furthermore, the supporting frame 22 serves to protect the fins from being injured. In Figure 8 I have shown the heat exchange unit fastened to a panel 30 which is intended to designate the rear wall of a conventional refrigerator.

While I have described the heat exchange unit as applied to a refrigerator for use in condensing compressed refrigerant, it is obvious that the heat exchanger could be used in other types of installations without departing from the spirit of my invention.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claim.

Having thus described my invention, I claim:

The method of manufacturing heat exchangers which comprises forming a longitudinally extending groove adjacent one edge of a strip of material, positioning a length of bonding material in the groove, compressing and flattening the marginal portions of the strip to reduce the marginal portions of the strip to a thickness less than the thickness of the intermediate portion of the strip, utilizing the step of compressing and flattening the marginal portions to simultaneously securely embed and condense all of the bonding material entirely within the confines of the groove, forming the strip into tube formation with the reduced marginal portions in overlapping contacting relationship so as to form a longitudinally extending seam, cutting the tube thus formed into relatively short sections, passing the short sections of tubing through aligned openings provided in a series of spaced fins, applying heat to the assembly only for a sufficient time to fuse and expand the bonding material to cause enough flow thereof into the seams of the tubes and onto the outer surfaces of the tubes so as to properly braze the seams and bond the fins to the tubes, and thereafter cooling the assembly so as to prevent further flow of bonding material.

References Cited in the file of this patent

UNITED STATES PATENTS

| | | |
|---|---|---|
| 2,232,562 | Sandberg | Feb. 18, 1941 |
| 2,267,315 | Stikeleather | Dec. 23, 1941 |
| 2,294,030 | Higham et al. | Aug. 25, 1942 |
| 2,322,145 | Kritzer | June 15, 1943 |
| 2,347,957 | McCullough | May 2, 1944 |
| 2,462,511 | Kramer | Feb. 22, 1949 |
| 2,475,566 | Karmazin | July 5, 1949 |
| 2,519,820 | Bruegger | Aug. 22, 1950 |